United States Patent
Snyder, II et al.

(12)

(10) Patent No.: US 6,760,337 B1
(45) Date of Patent: Jul. 6, 2004

(54) INTEGRATED CIRCUIT THAT PROCESSES COMMUNICATION PACKETS WITH SCHEDULER CIRCUITRY HAVING MULTIPLE PRIORITY LEVELS

(75) Inventors: Wilson P. Snyder, II, Hudson, MA (US); Joseph B. Tompkins, Framingham, MA (US); Daniel J. Lussier, Holliston, MA (US)

(73) Assignee: Conexant Systems, Inc., Newport Beach, CA (US)

( * ) Notice: Subject to any disclaimer, the term of this patent is extended or adjusted under 35 U.S.C. 154(b) by 798 days.

(21) Appl. No.: 09/639,966

(22) Filed: Aug. 16, 2000

Related U.S. Application Data

(60) Provisional application No. 60/149,376, filed on Aug. 17, 1999.

(51) Int. Cl.[7] .............................. H04L 12/56; G06F 9/00
(52) U.S. Cl. ............................... 370/395.4; 370/395.42; 709/240
(58) Field of Search .................... 370/231, 235, 370/389, 395.1, 395.4, 395.42, 395.43, 400, 428; 709/201, 230, 232, 234, 238, 240

(56) References Cited

U.S. PATENT DOCUMENTS

| | | | |
|---|---|---|---|
| 4,794,526 A | * 12/1988 | May et al. | .................. 709/103 |
| 5,748,630 A | 5/1998 | Bergantino et al. | |
| 5,920,561 A | 7/1999 | Daniel et al. | |
| 6,208,661 B1 | * 3/2001 | Marshall | ..................... 370/412 |
| 6,418,169 B1 | * 7/2002 | Datari | ................... 375/240.28 |
| 6,477,562 B2 | * 11/2002 | Nemirovsky et al. | ....... 709/108 |

FOREIGN PATENT DOCUMENTS

| | | |
|---|---|---|
| EP | 0 710 046 A2 | 1/1996 |

\* cited by examiner

*Primary Examiner*—Alpus H. Hsu
(74) *Attorney, Agent, or Firm*—Keith Kind; Kelly H. Hale

(57) ABSTRACT

An integrated circuit processes communication packets and comprises a core processor and scheduling circuitry. The core processor executes a software application that directs the core processor to process the communication packets. The scheduling circuitry comprises multiple scheduling boards where at least some of the scheduling boards have multiple priority levels. The scheduling circuitry processes the scheduling boards to schedule and subsequently initiate transmission of the communication packets.

18 Claims, 9 Drawing Sheets

| CLASS | EXTERNAL BUFFERS | POOL | TYPE | FAIL OVER |
|---|---|---|---|---|
| 1 | 1 - 500 | A | STATIC | -- |
| 2 | 501 - 1000 | A | EXCL. | 3 |
| 3 | 1001 - 1500 | A | SHARED | -- |
| 4 | 1501 - 2000 | A | EXCL. | 6 |
| 5 | 2001 - 2500 | A | EXCL. | 6 |
| 6 | 2501 - 3000 | A | SHARED | -- |
| 7 | 3001 - 3500 | A | STATIC | -- |
| 8 | 3501 - 4000 | A | STATIC | -- |
| 9 | 4001 - 4500 | B | STATIC | -- |
| 10 | 4501 - 5000 | B | EXCL. | 11 |
| 11 | 5001 - 5500 | B | SHARED | -- |
| 12 | 5501 - 6000 | B | EXCL. | 14 |
| 13 | 6001 - 6500 | B | EXCL. | 14 |
| 14 | 6501 - 7000 | B | SHARED | -- |
| 15 | 7001 - 7500 | B | STATIC | -- |
| 16 | 7501 - 8000 | B | STATIC | -- |

*FIG. 6*

| BOARD 731 | | | | | |
|---|---|---|---|---|---|
| TIME PERIOD | 1 | 2 | 3 | 4 | 5 |
| PRIORITY #1 | 1 | 0 | 1 | 0 | 1 |
| PRIORITY #2 | 0 | 0 | 1 | 0 | 0 |
| PRIORITY #3 | 0 | 0 | 0 | 1 | 0 |
| PRIORITY #4 | 0 | 1 | 0 | 0 | 1 |

FIG. 9

INTEGRATED CIRCUIT THAT PROCESSES COMMUNICATION PACKETS WITH SCHEDULER CIRCUITRY HAVING MULTIPLE PRIORITY LEVELS

RELATED CASES

This application is related to U.S. provisional patent application 60/149,376, entitled "HIGH SPEED COMMUNICATIONS PROCESSING DEVICE FOR INTERNET PROTOCOL, ASYNCHRONOUS TRANSFER MODE, FRAME RELAY, AND SONET COMMUNICATIONS", filed on Aug. 17,1999, and which is hereby incorporated by reference.

BACKGROUND OF THE INVENTION

1. Field of the Invention

The invention is related to the field of communications, and in particular, to integrated circuits that process communication packets.

2. Statement of the Problem

Communications systems transfer information in packet streams. The packets in the streams each contain a header and a payload. The header contains control information, such as addressing or channel information, that indicate how the packet should be handled. The payload contains the information that is being transferred. Some packets are broken into segments for processing. The term "packet" is intended to include packet segments. Some examples of packets include, Asynchronous Transfer Mode (ATM) cells, Internet Protocol (IP) packets, frame relay packets, Ethernet packets, or some other packet-like information block.

An integrated circuit known as a stream processor has been developed recently to address the special needs of packet communication networking. Traffic stream processors are designed to apply robust functionality to extremely high-speed packet streams. This dual design requirement is often in conflict because the high-speeds limit the level of functionality that can be applied to the packet stream.

Robust functionality is critical with today's diverse but converging communication systems. Stream processors must handle multiple protocols and interwork between streams of different protocols. Stream processors must also ensure that quality-of-service constraints are met with respect to bandwidth and priority. Each stream should receive the bandwidth allocation and priority that is defined in corresponding service level agreements. This functionality must be applied differently to different streams—possibly thousands of different streams.

To provide such functionality, a RISC-based core processor was developed with its own network-oriented instruction set. The instruction set is designed to accomplish common networking tasks in the fewest cycles. The core processor executes software applications built from the instruction set to apply the robust functionality to high-speed packet streams.

A primary task of the core processor is managing a packet transmission schedule. The schedule must attempt to maintain various bandwidth guarantees across multiple streams of traffic. Often, this is implemented through a complex prioritization scheme. For example, real time traffic is a higher priority than non-real time traffic, and e-mail traffic is a higher priority than system back-up traffic. Unfortunately, scheduling of this complex nature requires significant core processing capacity. This use of processing capacity for prioritized scheduling diminishes the level of functionality provided by the stream processor.

SUMMARY OF THE SOLUTION

The invention helps solve the above problems with an integrated circuit that functions as a traffic stream processor. The integrated circuit has a core processor and scheduling circuitry. The scheduling circuitry handles prioritized scheduling for the core processor. The scheduling circuitry reserves packet transmission over various channels using channel specific context. Within a given reservation time period, multiple channels can be reserved at different priority levels. The prioritized scheduling allows the integrated circuit to allocate bandwidth among multiple channels in accord with service level agreements.

The integrated circuit processes communication packets and comprises a core processor and scheduling circuitry. The core processor executes a software application that directs the core processor to process the communication packets. The scheduling circuitry comprises multiple scheduling boards wherein at least some of the scheduling boards have multiple priority levels. The scheduling circuitry processes the scheduling boards to schedule and subsequently initiate transmission of the communication packets. In some examples of the invention, the scheduling circuitry processes each of the scheduling boards independently of the other scheduling boards.

In some examples of the invention, the scheduling circuitry moves a fence across the time periods on one of the boards at time intervals. The scheduling circuitry initiates packet transmission for one of the reservations at the fence that is at a higher one of the priority levels than the other reservations at the fence. The scheduling circuitry advances the fence at the higher one of the priority levels by one of the time periods at a next one of the time intervals after initiating packet transmission for the one reservation. The scheduling circuitry does not advance the fence for the other reservations at the fence at next one of the time intervals after initiating packet transmission for the one reservation.

In some examples of the invention, the scheduling circuitry comprises a context memory and is configured to associate each scheduling board with a different portion of the context memory. Each scheduling board is separated into time periods at each of the priority levels. The context memory comprises a plurality of entries that each store one of a plurality of channel descriptor indicators. Each of the time periods at each of the priority levels on each of the scheduling boards is associated with a different one of the context memory entries.

In some examples of the invention, the scheduling circuitry sets a first bit in a first one of the time periods at a first one of the priority levels on one of the scheduling boards to schedule packet transmission over a first channel corresponding to a first one of the channel descriptors stored in a first one of the entries associated with the first time period at the first priority level. The scheduling circuitry may set a second bit in the first time period at a second one of the priority levels on the one scheduling board to schedule packet transmission over a second channel corresponding to a second one of the channel descriptors stored in a second one of the entries associated with the first time period at the second priority level. The scheduling circuitry initiates packet transmission for the first time period over the first channel but not the second channel because the first priority level is higher than the second priority level. The scheduling circuitry may set a second bit in a second one of the time periods at a second one of the priority levels on the one scheduling board to schedule packet transmission over a second channel corresponding to a second one of the channel descriptors stored in a second one of the entries associated with the second time period at the second priority level. The scheduling circuitry initiates packet transmission for the first time period over the first channel but not the second channel because the first priority level is higher than the second priority level.

DESCRIPTION OF THE DRAWINGS

The same reference number represents the same element on all drawings.

FIG. 6 is a table that illustrates buffer classes in an example of the invention.

FIG. 9 is block diagram that illustrates a scheduling board in an example of the invention.

DETAILED DESCRIPTION OF THE INVENTION

Figure 1:
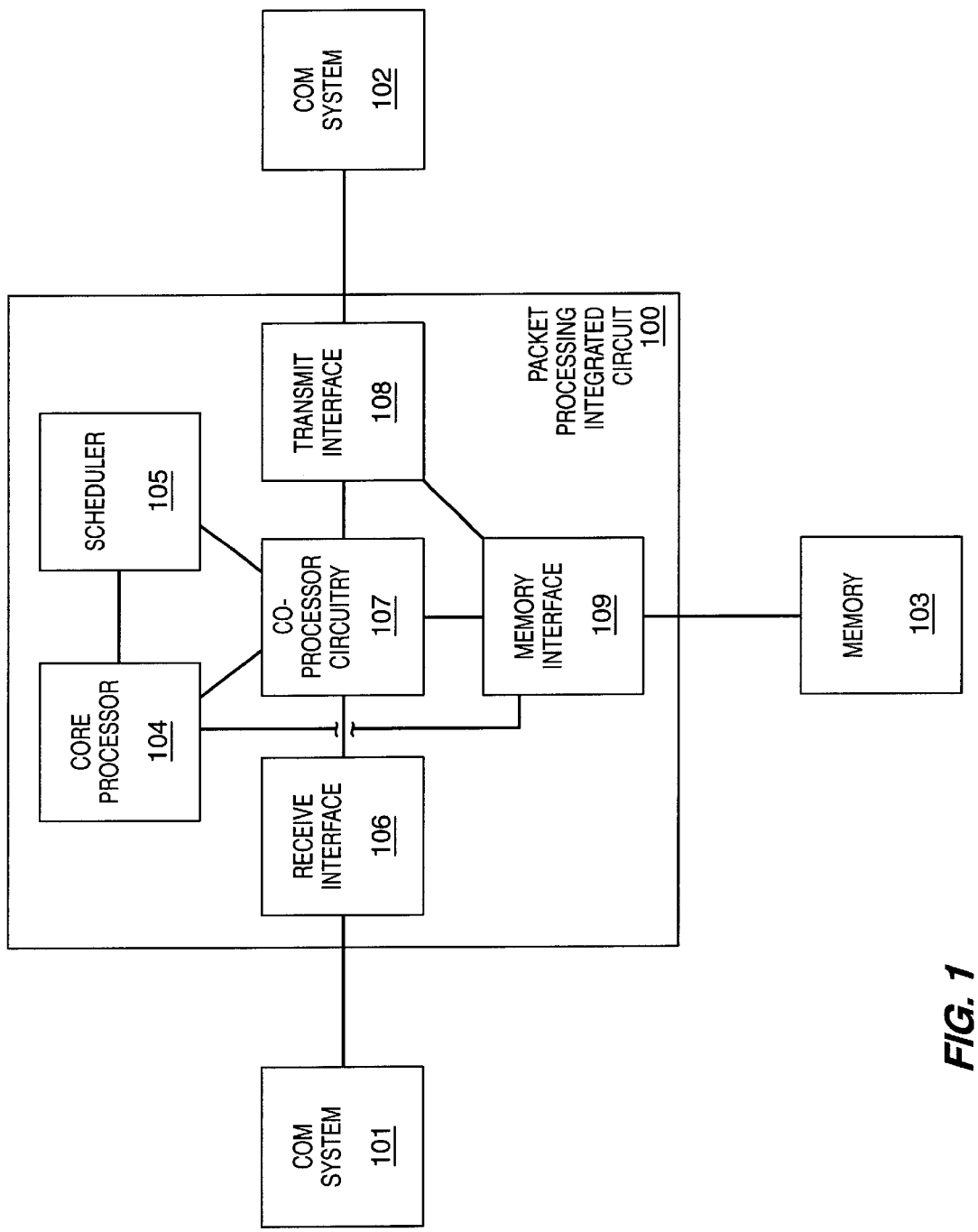
FIG. 1 is a block diagram that illustrates a packet processing integrated circuit in an example of the invention.

Packet Processing Integrated Circuit—FIG. 1

FIG. 1 depicts a specific example of an integrated circuit in accord with the present invention. Those skilled in the art will appreciate numerous variations from this example that do not depart from the scope of the invention. Those skilled in the art will also appreciate that various features could be combined to form multiple variations of the invention. Those skilled in the art will appreciate that some conventional aspects of FIG. 1 have been simplified or omitted for clarity. Various aspects of packet processing integrated circuits are discussed in U.S. Pat. No. 5,748,630, entitled "ASYNCHRONOUS TRANSFER MODE CELL PROCESSING WITH LOAD MULTIPLE INSTRUCTION AND MEMORY WRITE-BACK", filed May 9,1996, and which is hereby incorporated by reference into this application.

FIG. 1 is a block diagram that illustrates packet processing integrated circuit 100 in an example of the invention. Integrated circuit 100 comprises core processor 104, scheduler 105, receive interface 106, co-processor circuitry 107, transmit interface 108, and memory interface 109. These components may be interconnected through a memory crossbar or some other type of internal interface. Receive interface 106 is coupled to communication system 101. Transmit interface 108 is coupled to communication system 102. Memory interface is coupled to memory 103.

Communication system 101 could be any device that supplies communication packets with one example being the switching fabric in an Asynchronous Transfer Mode (ATM) switch. Communication system 101 could be any device that receives communication packets with one example being the physical line interface in the ATM switch. Memory 103 could be any memory device with one example being Random Access Memory (RAM) integrated circuits.

Receive interface 106 could be any circuitry configured to receive packets with some examples including UTOPIA interfaces or Peripheral Component Interconnect (PCI) interfaces. Transmit interface 108 could be any circuitry configured to transfer packets with some examples including UTOPIA interfaces or PCI interfaces.

Core processor 104 is a micro-processor that executes networking application software. Core-processor 104 supports an instruction set that has been tuned for networking operations—especially context switching. In some examples of the invention, core processor 104 has the following characteristics: 132 MHz, pipelined single-cycle operation, RISC-based design, 32-bit instruction and register set, 4K instruction cache, 8 KB zero-latency scratchpad memory, interrupt/trap/halt support, and C compiler readiness.

Scheduler 105 comprises circuitry configured to schedule and initiate packet processing that typically results in packet transmissions from integrated circuit 100, although scheduler 105 may also schedule and initiate other activities. Scheduler 105 schedules upcoming events, and as time passes, selects scheduled events for processing and re-schedules unprocessed events. Scheduler 105 transfers processing requests for selected events to co-processor circuitry 107. Scheduler 105 can handle multiple independent schedules to provide prioritized scheduling across multiple traffic streams. To provide scheduling, scheduler 105 may execute a guaranteed cell rate algorithm to implement a leaky bucket or a token bucket scheduling system. The guaranteed cell rate algorithm is implemented through a cache that holds algorithm parameters. Scheduler 105 is described in detail with respect to FIGS. 7–9.

Co-processor circuitry 107 receives communication packets from receive interface 106 and memory interface 109 and stores the packets in internal data buffers. Co-processor circuitry 107 correlates each packet to context information describing how the packet should be handled. Co-processor circuitry 107 stores the correlated context information in internal context buffers and associates individual data buffers with individual context buffers to maintain the correlation between individual packets and context information. Importantly, co-processor circuitry 107 ensures that only one copy of the correlated context information is present the context buffers to maintain coherency. Multiple data buffers are associated with a single context buffer to maintain the correlation between the multiple packets and the single copy the context information.

Co-processor circuitry 107 also determines a prioritized processing order for core processor 104. The prioritized processing order controls the sequence in which core processor 104 handles the communication packets. The prioritized processing order is typically based on the availability of all of the resources and information that are required by core processor 104 to process a given communication packet. Resource state bits are set when resources become available, so co-processor circuitry 107 may determine when all of these resources are available by processing the resource state bits. If desired, the prioritized processing order may be based on information in packet handling requests. Co-processor circuitry 107 selects scheduling algorithms based on an internal scheduling state bits and uses the selected scheduling algorithms to determine the prioritized processing order. The algorithms could be round robin, service-to-completion, weighted fair queuing, simple fairness, first-come first-serve, allocation through priority promotion, software override, or some other arbitration scheme. Thus, the prioritization technique used by co-processor circuitry 107 is externally controllable.

Figure 2:
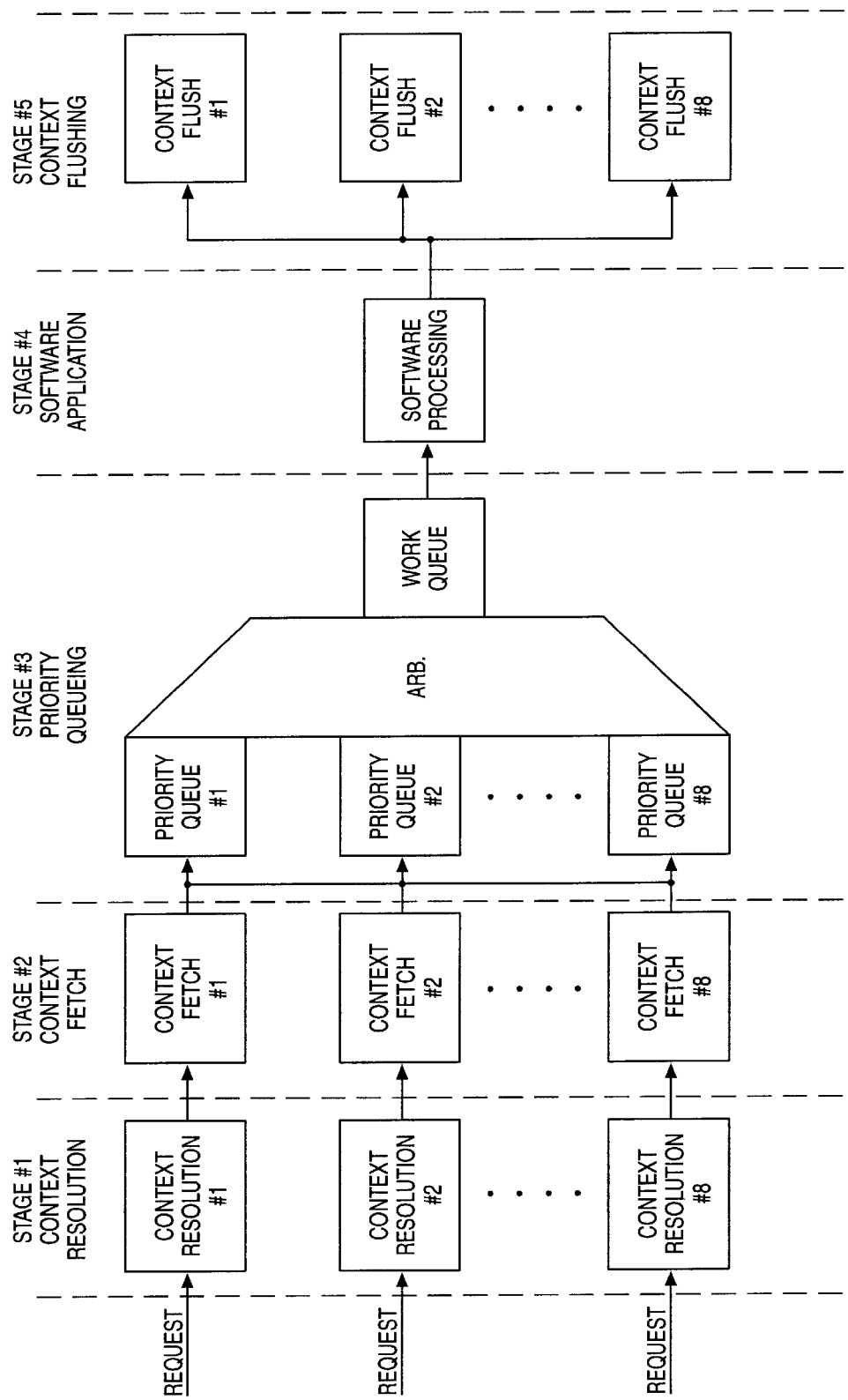
FIG. 2 is a block diagram that illustrates packet processing stages and pipe-lining in an example of the invention.
Figure 3:
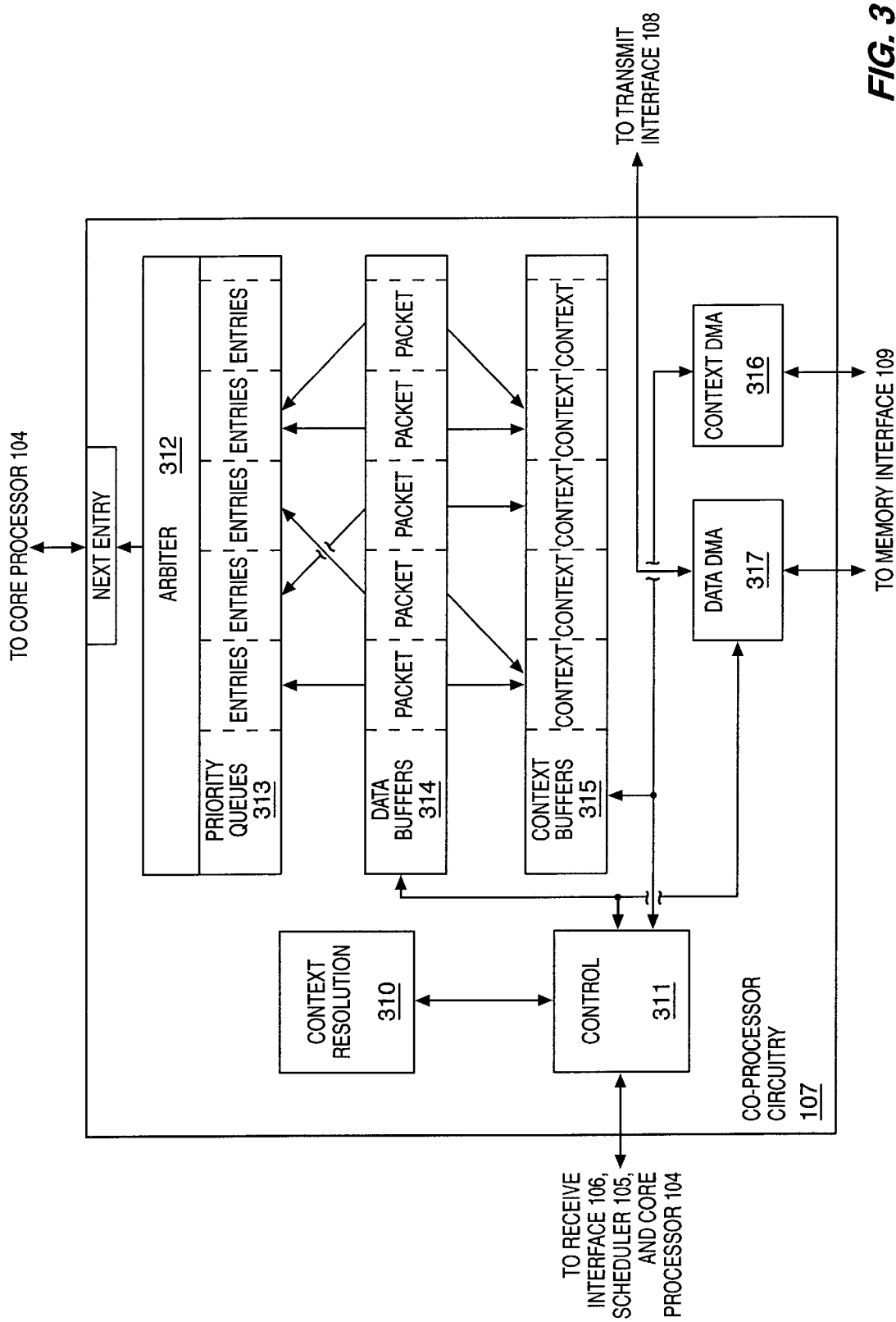
FIG. 3 is a block diagram that illustrates co-processor circuitry in an example of the invention.
Figure 4:
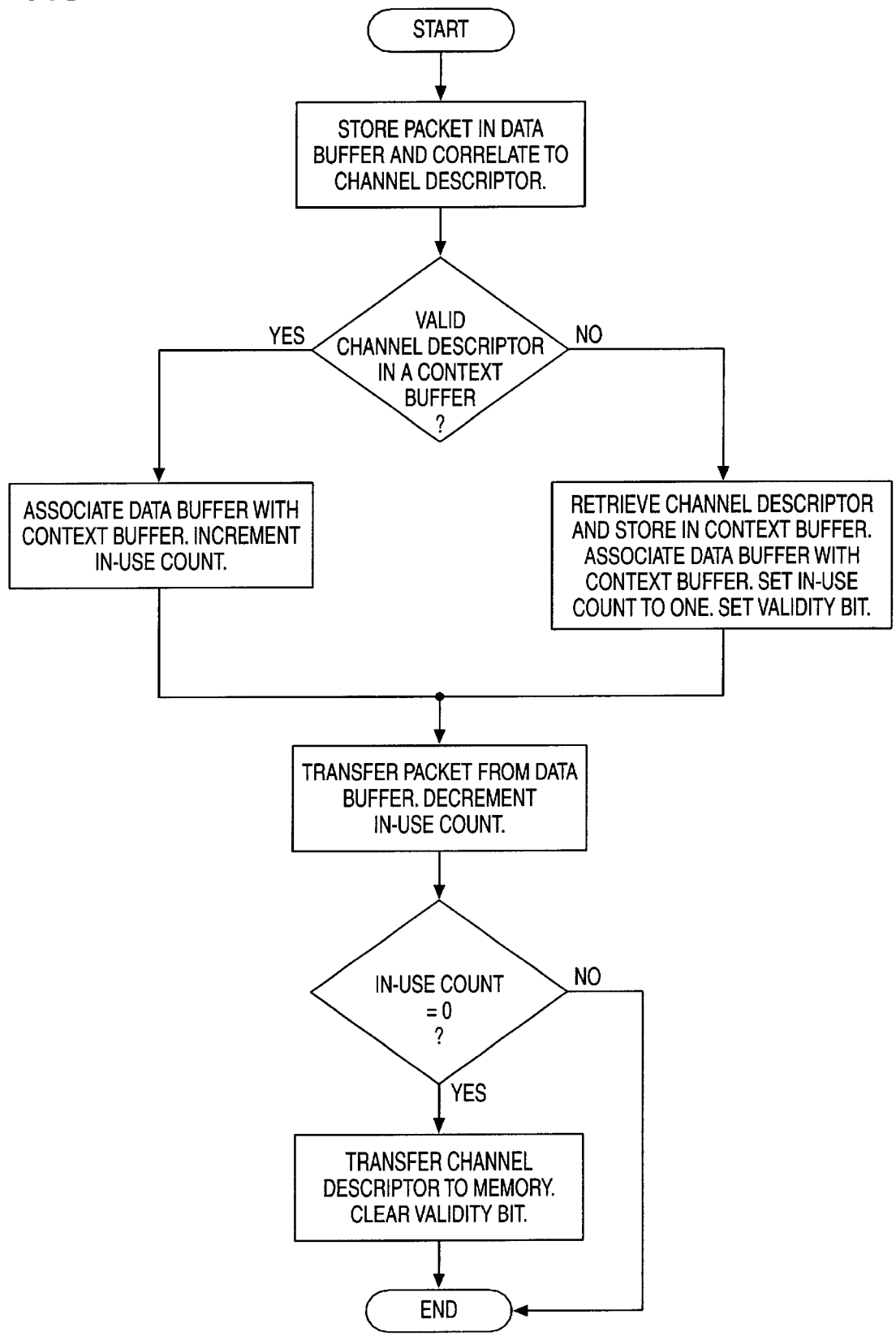
FIG. 4 is a flow diagram that illustrates buffer correlation and in-use counts in an example of the invention.

Co-processor circuitry 107 is described in more detail with respect to FIGS. 2–4.

Memory interface 109 comprises circuitry configured to exchange packets with external buffers in memory 103. Memory interface 109 maintains a pointer cache that holds pointers to the external buffers. Memory interface 109 allocates the external buffers when entities, such as core processor 104 or co-processor circuitry 107, read pointers from the pointer cache. Memory interface 109 de-allocates the external buffers when the entities write the pointers to the pointer cache. Advantageously, external buffer allocation and de-allocation is available through an on-chip cache read/write. Memory interface 109 also manages various external buffer classes, and handles conditions such as external buffer exhaustion. Memory interface 109 is described in detail with respect to FIGS. 5–6.

In operation, receive interface 106 receives new packets from communication system 101, and scheduler 105 initiates transmissions of previously received packets that are typically stored in memory 103. To initiate packet handling, receive interface 106 and scheduler 105 transfer requests to co-processor circuitry 107. Under software control, core processor 104 may also request packet handling from co-processor circuitry 107. Co-processor circuitry 107 fields the requests, correlates the packets with their respective context information, and creates a prioritized work queue for core processor 104. Core processor 104 processes the packets and context information in order from the prioritized work queue. Advantageously, co-processor circuitry 107 operates in parallel with core processor 104 to offload the context correlation and prioritization tasks to conserve important core processing capacity.

In response to packet handling, core processor 104 typically initiates packet transfers to either memory 103 or communication system 102. If the packet is transferred to memory 103, then core processor instructs scheduler 105 to schedule and initiate future packet transmission or processing. Advantageously, scheduler 105 operates in parallel with core processor 104 to offload scheduling tasks and conserve important core processing capacity.

Various data paths are used in response to core processor 104 packet transfer instructions. Co-processor circuitry 107 transfers packets directly to communication system 102 through transmit interface 108. Co-processor circuitry 107 transfers packets to memory 103 through memory interface 109 with an on-chip pointer cache. Memory interface 109 transfers packets from memory 103 to communication system 102 through transmit interface 108. Co-processor circuitry 107 transfers context information from a context buffer through memory interface 109 to memory 103 if there are no packets in the data buffers that are correlated with the context information in the context buffer. Advantageously, memory interface 109 operates in parallel with core processor 104 to offload external memory management tasks and conserve important core processing capacity.

Co-processor Circuitry—FIGS. 2–4

FIGS. 2–4 depict a specific example of co-processor circuitry in accord with the present invention. Those skilled in the art will appreciate numerous variations from this example that do not depart from the scope of the invention. Those skilled in the art will also appreciate that various features could be combined to form multiple variations of the invention. Those skilled in the art will appreciate that some conventional aspects of FIGS. 2–4 have been simplified or omitted for clarity.

FIG. 2 demonstrates how co-processor circuitry 107 provides pipe-lined operation. FIG. 2 is vertically separated by dashed lines that indicate five packet processing stages: 1) context resolution, 2) context fetching, 3) priority queuing, 4) software application, and 5) context flushing. Co-processor circuitry 107 handles stages 1–3 to provide hardware acceleration. Core processor 104 handles stage 4 to provide software control with optimized efficiency due to stages 1–3. Co-processor circuitry 107 also handles stage 5. Co-processor circuitry 107 has eight pipelines through stages 1–3 and 5 to concurrently process multiple packet streams.

In stage 1, requests to handle packets are resolved to a context for each packet in the internal data buffers. The requests are generated by receive interface 106, scheduler 105, and core processor 104 in response to incoming packets, scheduled transmissions, and application software instructions. The context information includes a channel descriptor that has information regarding how packets in one of 64,000 different channels are to be handled. For example, a channel descriptor may indicate service address information, traffic management parameters, channel status, stream queue information, and thread status. Thus, 64,000 channels with different characteristics are available to support a wide array of service differentiation. Channel descriptors are identified by channel identifiers. Channel identifiers may be indicated by the request. A map may be used to translate selected bits from the packet header to a channel identifier. A hardware engine may also perform a sophisticated search for the channel identifier based on various information. Different algorithms that calculate the channel identifier from the various information may be selected by setting correlation state bits in co-processor circuitry 107. Thus, the technique used for context resolution is externally controllable.

In stage 2, context information is fetched, if necessary, by using the channel identifiers to transfer the channel descriptors to internal context buffers. Prior to the transfer, the context buffers are first checked for a matching channel identifier and validity bit. If a match is found, then the context buffer with the existing channel descriptor is associated with the corresponding internal data buffer holding the packet.

In stage 3, requests with available context are prioritized and arbitrated for core processor 104 handling. The priority may be indicated by the request—and it may be the source of the request. The priority queues 1–8 are 16 entries deep. Priority queues 1–8 are also ranked in a priority order by queue number. The priority for each request is determined, and when the context and data buffers for the request are valid, an entry for the request is placed in one of the priority queues that corresponds to the determined priority. The entries in the priority queues point to a pending request state RAM that contains state information for each data buffer. The state information includes a data buffer pointer, a context pointer, context validity bit, requester indicator, port status, a channel descriptor loaded indicator.

The work queue indicates the selected priority queue entry that core processor 104 should handle next. To get to the work queue, the requests in priority queues are arbitrated using one of various algorithms such as round robin, service-to-completion, weighted fair queuing, simple fairness, first-come first-serve, allocation through priority promotion, and software override. The algorithms may be selected through scheduling state bits in co-processor circuitry 107. Thus, the technique used for prioritization is externally controllable. Co-processor circuitry 107 loads core processor 104 registers with the channel descriptor information for the next entry in the work queue.

In stage 4, core processor 104 executes the software application to process the next entry in the work queue which points to a portion of the pending state request RAM that identifies the data buffer and context buffer. The context buffer indicates one or more service addresses that direct the core processor to the proper functions within the software application. One such function of the software application is traffic shaping to conform to service level agreements. Other functions include header manipulation and translation, queuing algorithms, statistical accounting, buffer management, interworking, header encapsulation or stripping, cyclic redundancy checking, segmentation and reassembly, frame relay formatting, multicasting, and routing. Any context information changes made by the core processor are linked back to the context buffer in real time.

In stage 5, context is flushed. Typically, core processor 104 instructs co-processor circuitry 107 to transfer packets to off-chip memory 103 or transmit interface 108. If no other data buffers are currently associated with the pertinent context information, then co-processor circuitry 107 transfers the context information to off-chip memory 103.

FIG. 3 is a block diagram that illustrates co-processor circuitry 107 in an example of the invention. Co-processor circuitry 107 comprises a hardware engine that is firmware-programmable in that it operates in response to state bits and register content. In contrast, core processor 104 is a microprocessor that executes application software. Co-processor circuitry 107 operates in parallel with core processor 104 to conserve core processor capacity by off-loading numerous tasks from the core processor.

Co-processor circuitry 107 comprises context resolution 310, control 311, arbiter 312, priority queues 313, data buffers 314, context buffers 315, context DMA 316, and data DMA 317. Data buffers 314 hold packets and context buffers 315 hold context information, such as a channel descriptor. Data buffers 314 are relatively small and of a fixed size, such as 64 bytes, so if the packets are ATM cells, each data buffer holds only a single ATM cell and ATM cells do not cross data buffer boundaries.

Individual data buffers 314 are associated with individual context buffers 315 as indicated by the downward arrows. Priority queues 313 hold entries that represent individual data buffers 314 as indicated by the upward arrows. Thus, a packet in one of the data buffers is associated with its context information in an associated one of the context buffers 315 and with an entry in priority queues 313. Arbiter 312 presents a next entry from priority queues 313 to core processor 104 which handles the associated packet in the order determined by arbiter 312.

Context DMA 316 exchanges context information between memory 103 and context buffers 315 through memory interface 109. Context DMA automatically updates queue pointers in the context information. Data DMA 317 exchanges packets between data buffers 314 and memory 103 through memory interface 109. Data DMA 317 also transfers packets from memory 103 to transmit interface 108 through memory interface 109. Data DMA 317 signals context DMA 316 when transferring packets off-chip, and context DMA 316 determines if the associated context should be transferred to off-chip memory 103. Both DMAs 316-317 may be configured to perform CRC calculations.

For a new packet from communication system 101, control 311 receives the new packet and a request to handle the new packet from receive interface 106. Control 311 receives and places the packet in one of the data buffers 314 and transfers the packet header to context resolution 310. Based on gap state bits, a gap in the packet may be created between the header and the payload in the data buffer, so core processor 104 can subsequently write encapsulation information to the gap without having to create the gap. Context resolution 310 processes the packet header to correlate the packet with a channel descriptor—although in some cases, receive interface 106 may have already performed this context resolution. The channel descriptor comprises information regarding packet transfer over a channel.

Control 311 determines if the channel descriptor that has been correlated with the packet is already in one of the context buffers 315 and is valid. If so, control 311 does not request the channel descriptor from off-chip memory 103. Instead, control 311 associates the particular data buffer 314 holding the new packet with the particular context buffer 315 that already holds the correlated channel descriptor. This prevents multiple copies of the channel descriptor from existing in context buffers 314. Control 311 then increments an in-use count for the channel descriptor to track the number of data buffers 314 that are associated with the same channel descriptor. If the correlated channel descriptor is not in context buffers 315, then control 311 requests the channel descriptor from context DMA 316. Context DMA 316 transfers the requested channel descriptor from off-chip memory 103 to one of the context buffers 315 using the channel descriptor identifier, which may be an address, that was determined during context resolution. Control 311 associates the context buffer 315 holding the transferred channel descriptor with the data buffer 314 holding the new packet to maintain the correlation between the new packet and the channel descriptor. Control 311 also sets the in-use count for the transferred channel descriptor to one and sets the validity bit to indicate context information validity.

Control 311 also determines a priority for the new packet. The priority may be determined by the source of the new packet, header information, or channel descriptor. Control 311 places an entry in one of priority queues 313 based on the priority. The entry indicates the data buffer 314 that has the new packet. Arbiter 312 implements an arbitration scheme to select the next entry for core processor 104. Core processor 104 reads the next entry and processes the associated packet and channel descriptor in the particular data buffer 314 and context buffer 315 indicated in the next entry.

Each priority queue has a service-to-completion bit and a sleep bit. When the service-to-completion bit is set, the priority queue has a higher priority that any priority queues without the service-to-completion bit set. When the sleep bit is set, the priority queues is not processed until the sleep bit is cleared. The ranking of the priority queue number breaks priority ties. Each priority queue has a weight from 0-15 to ensure a certain percentage of core processor handling. After an entry from a priority queue is handled, its weight is decremented by one if the service-to-completion bit is not set. The weights are re-initialized to a default value after 128 requests have been handled or if all weights are zero. Each priority queue has a high and low watermark. When outstanding requests that are entered in a priority queue exceed its high watermark, the service-to-completion bit is set. When the outstanding requests fall to the low watermark, the service-to-completion bit is cleared. The high watermark is typically set at the number of data buffers allocated to the priority queue.

Core processor 104 may instruct control 311 to transfer the packet to off-chip memory 103 through data DMA 317. Control 311 decrements the context buffer in-use count, and if the in-use count is zero (no data buffers 314 are associated with the context buffer 315 holding the channel descriptor), then control 311 instructs context DMA 316 to transfer the channel descriptor to off-chip memory 103. Control 311 also clears the validity bit. This same general procedure is followed when scheduler 105 requests packet transmission, except that in response to the request from scheduler 105, control 311 instructs data DMA 317 to transfer the packet from memory 103 to one of data buffers 314.

FIG. 4 is a flow diagram that illustrates the operation of co-processor circuitry 107 when correlating buffers in an example of the invention. Co-processor circuitry 107 has eight pipelines to concurrently process multiple packet streams in accord with FIG. 3. First, a packet is stored in a data buffer, and the packet is correlated to a channel descriptor as identified by a channel identifier. The channel descriptor comprises the context information regarding how packets in one of 64,000 different channels are to be handled.

Next, context buffers 314 are checked for a valid version of the correlated channel descriptor. This entails matching the correlated channel identifier with a channel identifier in a context buffer that is valid. If the correlated channel descriptor is not in a context buffer that is valid, then the channel descriptor is retrieved from memory 103 and stored in a context buffer using the channel identifier. The data buffer holding the packet is associated with the context buffer holding the transferred channel descriptor. An in-use count for the context buffer holding the channel descriptor is set to one. A validity bit for the context buffer is set to indicate that the channel descriptor in the context buffer is valid. If the correlated channel descriptor is already in a context buffer that is valid, then the data buffer holding the packet is associated with the context buffer already holding the channel descriptor. The in-use count for the context buffer holding the channel descriptor is incremented.

Typically, core processor 104 instructs co-processor circuitry 107 to transfer packets to off-chip memory 103 or transmit interface 108. Data DMA 317 transfers the packet and signals context DMA 316 when finished. Context DMA 316 decrements the in-use count for the context buffer holding the channel descriptor, and if the decremented in-use count equals zero, then context DMA 316 transfers the channel descriptor to memory 103 and clears the validity bit for the context buffer.

Figure 5:
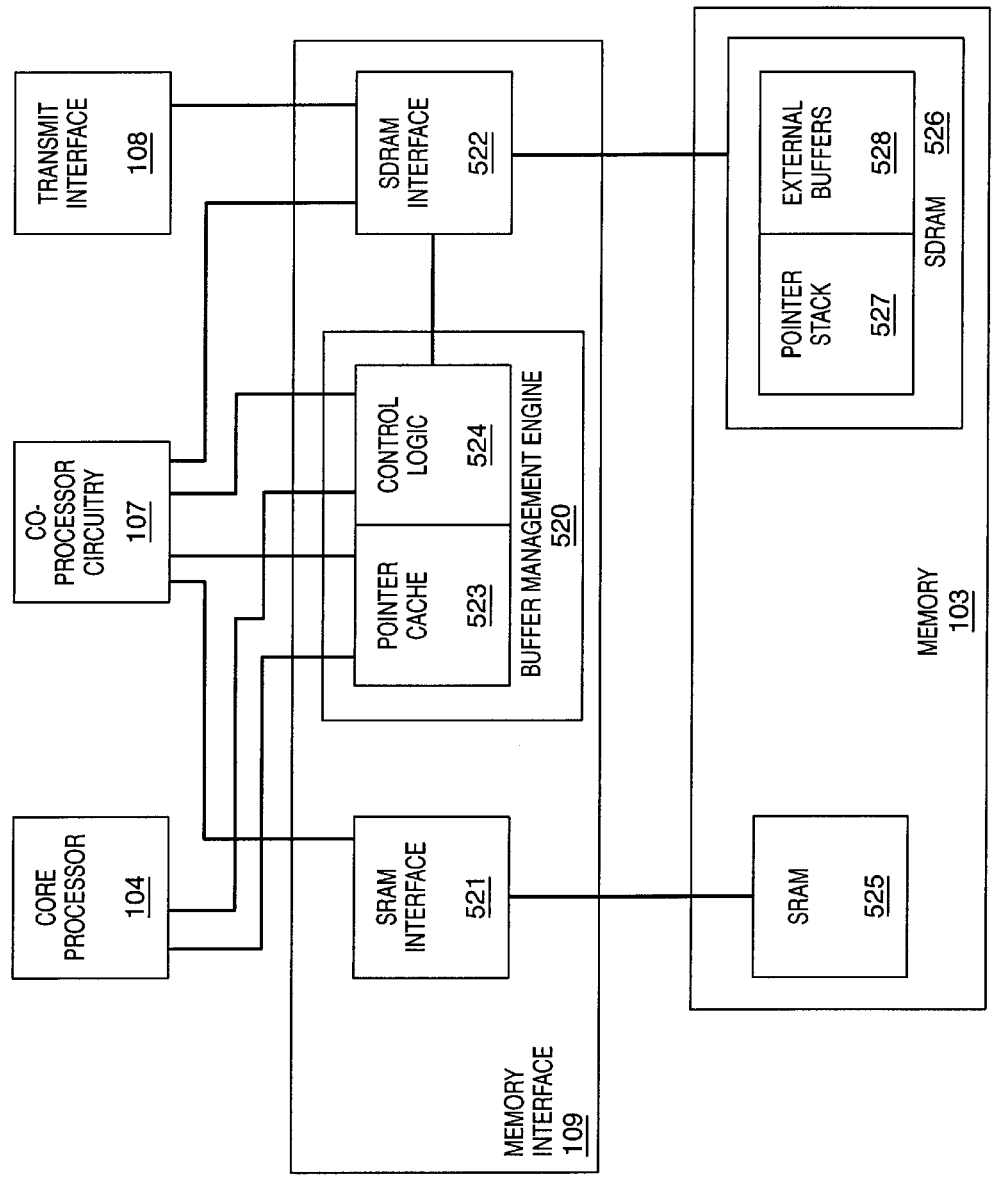
FIG. 5 is a block diagram that illustrates buffer management circuitry in an example of the invention.

Memory Interface 109—FIGS. 5–6

FIGS. 5–6 depict a specific example of memory interface circuitry in accord with the present invention. Those skilled in the art will appreciate numerous variations from this example that do not depart from the scope of the invention. Those skilled in the art will also appreciate that various features could be combined to form multiple variations of the invention. Those skilled in the art will appreciate that some conventional aspects of FIGS. 5–6 have been simplified or omitted for clarity.

FIG. 5 is a block diagram that illustrates memory interface 109 in an example of the invention. Memory interface 109 comprises a hardware circuitry engine that is firmware-programmable in that it operates in response to state bits and register content. In contrast, core processor 104 is a microprocessor that executes application software. Memory interface 109 operates in parallel with core processor 104 to conserve core processor capacity by off-loading numerous tasks from the core processor.

From FIG. 1, FIG. 5 shows memory 103, core processor 104, co-processor circuitry 107, transmit interface 108, and memory interface 109. Memory 103 comprises Static RAM (SRAM) 525 and Synchronous Dynamic RAM (SDRAM) 526, although other memory systems could be used in other examples of the invention. SDRAM 526 comprises pointer stack 527 and external buffers 528. Memory interface 109 comprises buffer management engine 520, SRAM interface 521, and SDRAM interface 522. Buffer management engine 520 comprises pointer cache 523 and control logic 524.

Conventional components could be used for SRAM interface 521, SDRAM interface 522, SRAM 525, and SDRAM 526. SRAM interface 521 exchanges context information between SRAM 525 and co-processor circuitry 107. External buffers 528 use a linked list mechanism to store communication packets externally to integrated circuit 100. Pointer stack 527 is a cache of pointers to free external buffers 528 that is initially built by core processor 104. Pointer cache 523 stores pointers that were transferred from pointer stack 527 and correspond to external buffers 528. Sets of pointers may be periodically exchanged between pointer stack 527 and pointer cache 523. Typically, the exchange from stack 527 to cache 523 operates on a first-in/first-out basis.

In operation, core processor 104 writes pointers to free external buffers 528 to pointer stack 527 in SDRAM 526. Through SDRAM interface 522, control logic 524 transfers a subset of these pointers to pointer cache 523. When an entity, such as core processor 104, co-processor circuitry 107, or an external system, needs to store a packet in memory 103, the entity reads a pointer from pointer cache 523 and uses the pointer to transfer the packet to external buffers 528 through SDRAM interface 522. Control logic 524 allocates the external buffer as the corresponding pointer is read from pointer cache 523. SDRAM stores the packet in the external buffer indicated by the pointer. Allocation means to reserve the buffer, so other entities do not improperly write to it while it is allocated.

When the entity no longer needs the external buffer—for example, the packet is transferred from memory 103 through SDRAM interface 522 to co-processor circuitry 107 or transmit interface 108—then the entity writes the pointer to pointer cache 523. Control logic 524 de-allocates the external buffer as the corresponding pointer is written to pointer cache 523. De-allocation means to release the buffer, so other entities may reserve it. The allocation and de-allocation process is repeated for other external buffers 528.

Control logic 524 tracks the number of the pointers in pointer cache 523 that point to de-allocated external buffers 528. If the number reaches a minimum threshold, then control logic 524 transfers additional pointers from pointer stack 527 to pointer cache 523. Control logic 524 may also transfer an exhaustion signal to core processor 104 in this situation. If the number reaches a maximum threshold, then control logic 524 transfers an excess portion of the pointers from pointer cache 523 to pointer stack 527.

FIG. 5 is a table that illustrates buffer classes in an example of the invention. In the example of FIG. 3, there are 16 classes with 500 external buffers each for a total of 8,000 external buffers. Each class has a type: static, exclusive, or shared. Static classes use their own external buffers without sharing. Exclusive classes use their own external buffers first, and then borrow external buffers from the fail-over classes. De-allocated external buffers from a given exclusive class are credited to the associated fail-over class until the number of borrowed external buffers is zero. Shared classes use their own external buffers and comprise the fail-over external buffers for the exclusive classes.

Buffer classes are used to differentiate services among traffic streams by assigning different streams to different classes of external buffers.. Traffic streams offering a higher quality-of-service are typically provided with greater access to external buffers. Bursty traffic may need an elastic exclusive/shared class arrangement. A class may be associated with only one type of traffic, such as Constant Bit Rate (CBR), Available Bit Rate (ABR), Variable Bit Rate (VBR), or Unspecified Bit Rate (UBR). CBR traffic without bursts typically uses static classes. ABR traffic uses exclusive and shared external buffer classes to respectively handle minimum cell rates and bursts. VBR and UBR traffic typically use shared buffer classes.

The external buffers are separated into two separately managed pools A and B. Pools can be used for service differentiation. Pools are also helpful when the external buffers are located in separate memory devices, so each device may have its own independently managed pool.

For each class, control logic 524 tracks the number of pointers in pointer cache 523 that point to the de-allocated external buffers and the number of pointers in pointer cache 523 that point to the allocated external buffers. If the number of pointers to the de-allocated external buffers in one of the classes reaches a minimum threshold for that class, control logic 524 transfers an exhaustion signal for that class to core processor 104. If the class is exclusive, control logic 524 may also borrow pointers from the corresponding fail-over class for use by the exclusive class, although conditions and thresholds may be used to limit the amount of borrowing. Control logic 524 tracks the number of pointers distributed to each class and may re-distribute pointers from one class to another based on certain conditions, such as traffic loads. In addition, more ABR traffic may require more exclusive buffers at the expense of shared buffers where more UBR traffic has the opposite effect.

Figure 7:
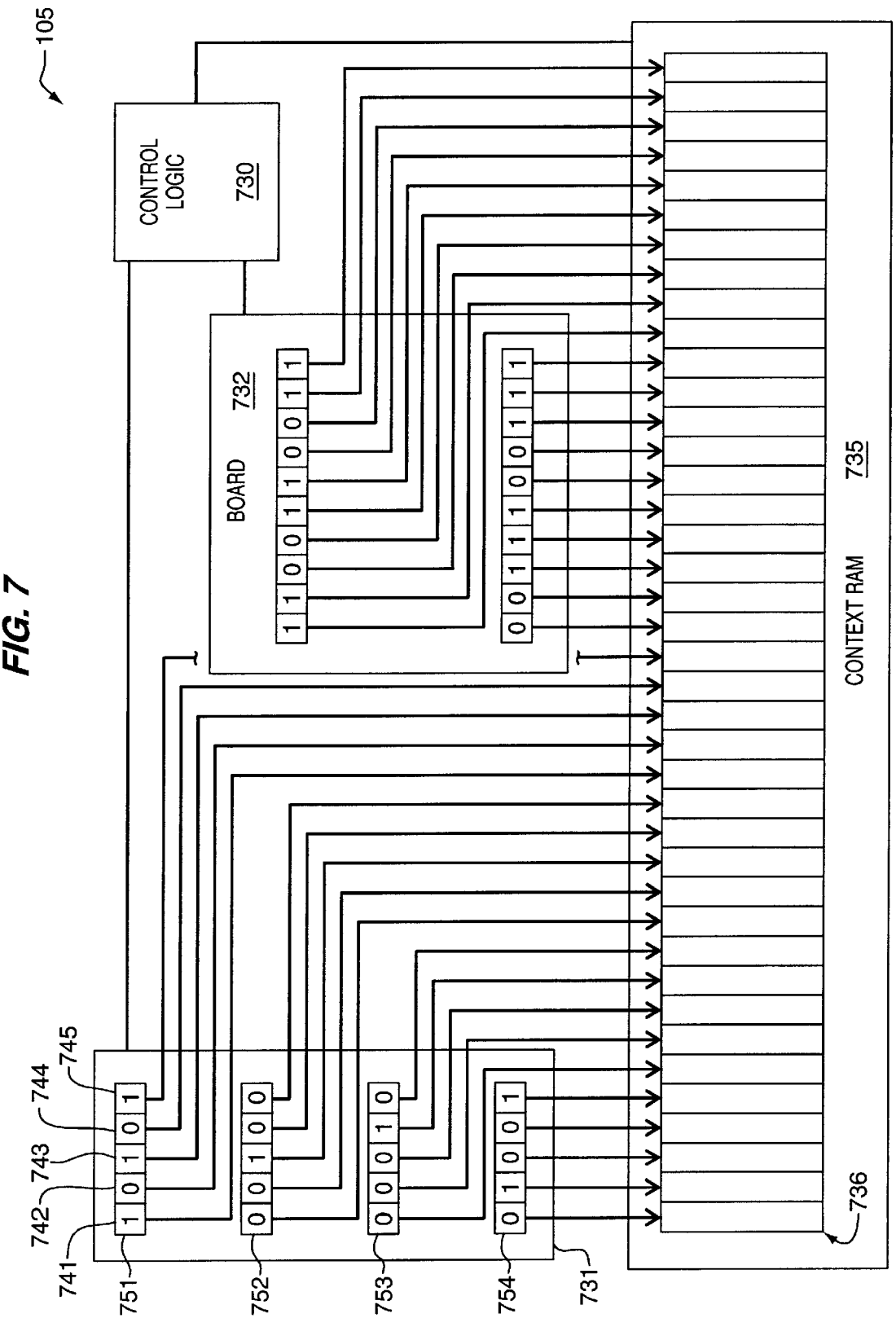
FIG. 7 is a block diagram that illustrates scheduler circuitry in an example of the invention.
Figure 8:
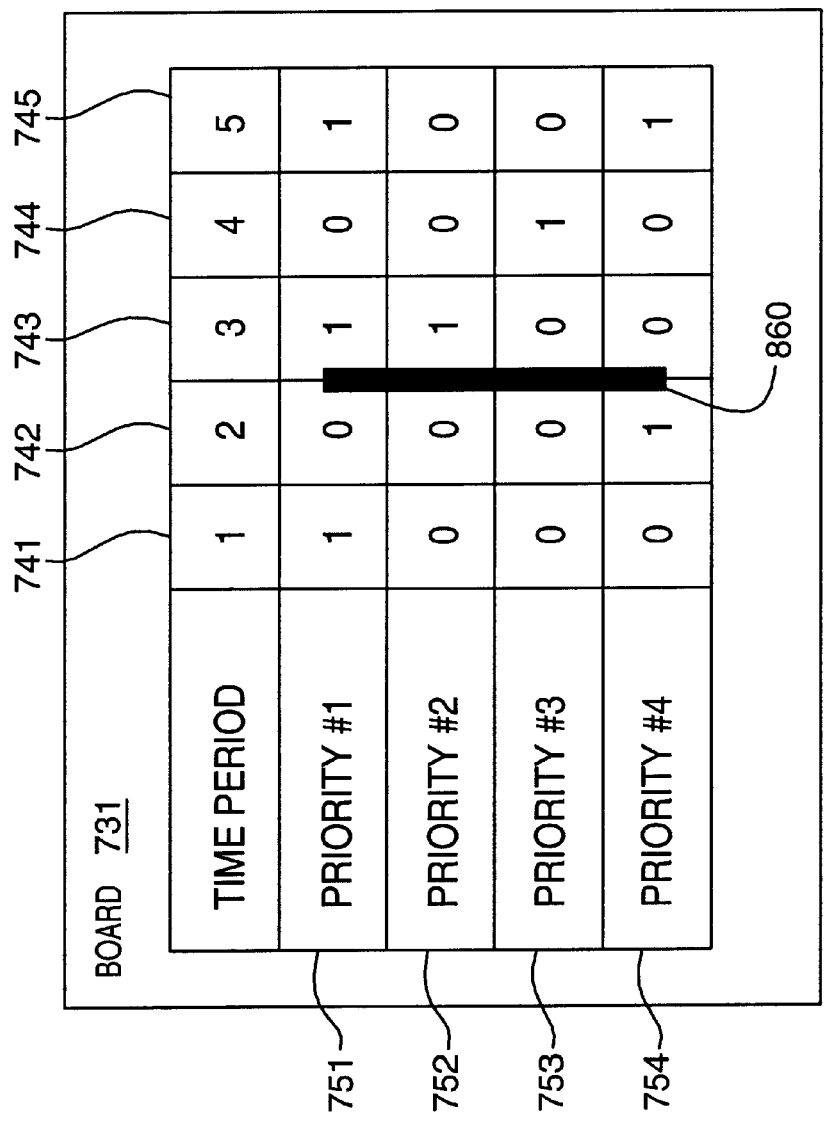
FIG. 8 is block diagram that illustrates a scheduling board in an example of the invention.

Scheduler Circuitry—FIGS. 7–9

FIGS. 7–9 depict a specific example of scheduler circuitry in accord with the present invention. Those skilled in the art will appreciate numerous variations from this example that do not depart from the scope of the invention. Those skilled in the art will also appreciate that various features could be combined to form multiple variations of the invention. Those skilled in the art will appreciate that some conventional aspects of FIGS. 7–9 have been simplified or omitted for clarity.

FIG. 7 is a block diagram that illustrates scheduler 105 in an example of the invention. Scheduler 105 comprises a hardware circuitry engine that is firmware-programmable in that it operates in response to state bits and register content. In contrast, core processor 104 is a micro-processor that executes application software. Scheduler 105 operates in parallel with core processor 104 to conserve core processor capacity by off-loading numerous tasks from the core processor.

Scheduler 105 comprises control logic 730, scheduling boards 731–732, and context RAM 735. Board 731 is vertically separated into time periods 741–745 where a "1" indicates a reservation at that time period and a "0" indicates no reservation at that time period. Board 731 is horizontally separated into priority levels 751–754 that are ranked from high at priority level #1 to low at priority level #4. Board 732 is similar to board 731, but has two priority levels and ten time periods. Control logic 730 process boards 731–732 independently of one another.

Context RAM 735 has entries 736 that each hold one of thousands of possible channel descriptor identifiers. The channel descriptors that correspond to these identifiers describe how packet transmission should be handled for a channel. For example, a channel descriptor indicates where packets for the channel are stored and how frequently they should be transmitted. Boards 731–732 are each associated with a different portion of context RAM 735. As indicated by the arrows, each time period at each priority level on each board is associated with its own one of the context RAM entries 736, and thus, with a possibly unique channel descriptor. To serve a reservation, control logic 730 sends a request that identifies the corresponding channel descriptor to co-processor circuitry 107.

In some examples of the invention, there are 64,000 channel descriptors, and thus, 64,000 corresponding board time periods. The 64,000 time periods can be distributed among boards in various combinations of 2,000, 4,000, 8,000, 16,000, 32,000, or 64,000 time periods per board. Boards can be separated into 1, 2, or, 4 priority levels that run concurrently in time. Each priority level uses up time periods, so an 8,000 time period board with four priority levels has 2,000 time periods per priority level that run concurrently. The minimum number of reservations in a given priority level is 512.

FIGS. 8–9 are block diagrams that illustrate scheduling board 731 in an example of the invention. Board 731 includes five time periods 741–745 and four priority levels 751–754. Fence 860 indicates the time period that control logic 730 is currently processing in each priority level. Control logic 730 processes board 731 to serve reservations and initiate packet transmissions at regular time intervals. At each time interval, referred to as a "GET", control logic 730 gets one reservation and advances fence 860. At a GET, fence 860 may advance in some priority levels but not others. As a result, fence 860 may be at different time periods in different priority levels.

At a GET, control logic 730 serves the highest priority reservation at fence 860. Control logic 860 then advances fence 860 to the next time period in the priority level that is served. Control logic 860 also advances fence 860 to the next time period in other priority levels that did not have a reservation at fence 860. Control logic 860 does not advance fence 860 at priority levels that had an un-served reservation at fence 860.

On FIG. 8, fence 860 is at time period 3 for all priority levels, and priority level 1 is served, priority level 2 is un-served, and priority levels 3 and 4 are not reserved. As a result and as shown on FIG. 9, fence 860 is advanced to time period 4 at priority levels 1, 3, and 4, but not at priority level 2. Priority level 2 will have the highest priority reservation at the next GET, because fence 860 remains at time period 3 in priority level 2, and priority level 1 has no reservation at time period 4.

The various scheduling boards and priority levels provide a robust mechanism for differentiating services between traffic streams based on service level agreements. For example, the highest priority level of board 732 could be traffic with a guaranteed bandwidth rate, and the lower priority level could be traffic without any bandwidth guarantee. Board 731 has four priority levels and may have Constant Bit Rate (CBR) traffic at the highest priority, real time Variable Bit Rate (VBR) traffic at the second-highest priority, non-real-time VBR traffic at the third-highest priority level, and Available Bit Rate (ABR) traffic at the fourth and lowest priority level. Traffic can also be allocated among boards to provide expensive high-quality service from one board, and cheap moderate-quality service from another board. Prioritization circuitry within co-processor circuitry 107 can assign channels on the high-quality board to the highest priority queue to core processor 104 and assign channels on the moderate-quality board to the highest priority queue to core processor 104.

A board stall occurs when a higher priority level starves a lower priority level, and a reservation at the lower priority level will never get served. In a board stall, control logic 730 does not advance fence 860 until the stall is cured. If a force option is selected, the indicated priority level is serviced at the next GET. If a scan option is selected, the above-described board processing is modified. All reservations in the highest priority level are serviced before any lower priority levels are serviced. In lower priority levels during this time, fence 860 is advanced at a GET if the time period is not reserved. The scan process repeats for the next highest priority level down through the lowest priority level.

Control logic 730 schedules a reservation in response to a "PUT" generated by core processor 104 or scheduler 105. Control logic 730 schedules the reservation by determining a start position. The start position is a number of time periods from the current fence location where the search starts for an available time period for the reservation. The start position may be specified in the PUT, or it may be calculated by control logic 730.

To calculate the start position, control logic 730 first retrieves scheduling parameters from the proper context buffer in co-processor circuitry 107 using a pointer in the PUT. Control logic 730 also increments the in-use count for the context buffer. Control logic 730 then executes dual Guaranteed Cell Rate (GCR) scheduling algorithms based on the scheduling parameters to determine the start position.

The scheduling parameters include a scheduling board indicator, first choice priority level, and second choice priority level that is a higher priority than the first choice. If the first priority level does not work for some reason, then the second priority level is attempted in a priority promotion. In a priority promotion, the control logic 730 tries to find a reservation based on the Minimum Cell Rate (MCR), and if nothing is available, then control logic 730 tries to find a reservation based on the Peak Cell Rate (PCR).

The scheduling parameters also include usage values that determine how the dual algorithms are used. Based on the usage values, algorithm 1 and algorithm 2 are respectively be used for:

PCR/nothing
MCR/PCR, or
Sustained Cell Rate (SCR)/PCR.

For algorithm 1 and algorithm 2, the scheduling parameters respectively include:

Theoretical Arrival Times (TAT1/TAT2),
Inter-Cell Intervals (ICI1/ICI2), and
limits (L1/L2).

The TATs are the expected arrival times, and the ICIs are the transmit frequencies. TATs are re-initialized if a reservation has been inactive for a long time (about one second).

The two scheduling algorithms are specified by the following pseudocode where $PT_t$ is the present time, $TAT1_{t-1}$, $TAT2_{t-1}$ are old times read from the context buffer, and $TAT1_t$, $TAT2_t$ are new times written to the context buffer.

```
if (PUT w/no update instruction) {
    ICI1 = 0
    ICI2 = 0
    PIPELAT= 0
}//else PUT with update; use the ICIs as provided
TAT2 = max (TAT2_{t-1} + ICI2, PT_t + ICI2)
if (ALG==MCR/PCR)
    TAT1_start = max (PT_t - L1, min (TAT1_{t-1} + ICI1, PT_t + L1))
    else TAT1_start = max (TAT1_{t-1} + ICI1, PT_t + ICI1)
    if (ALG==PCR/none) {
        start position = max (0, TAT1_t - L1 - PT_t)
    } else if (ALG==SCR/PCR) {
        start position = max (0, TAT2_t - L2 - PT_t, TAT1_t - L1 - PT_t)
    } else if (ALG==MCR/PCR) {
        start position = max (0, TAT2_t - L2 - PT_t)
    }
TAT2_t = max (TAT2_start, landing position + PT_t)
if (ALG==MCR/PCR) TAT1_t = TAT1_start
else TAT1_t = max (TAT1_start, landing position + PT_t)
if (PUT with write instruction) {
    write TAT1_t, TAT2_t, back to context buffer
}
decrement in-use count.
```

In addition to determining the starting position, control logic 730 determines the board configuration, fence location, and the oldest reservation at the fence in each priority level. Control logic 730 locates the start position from the fence at the selected priority level and on the selected scheduling board. Control logic 730 then searches for an available reservation time period. If the time period at the start time is already reserved, then the next available time period is reserved.

The number of time periods between the fence and the reserved time period is referred to as the landing position. The landing position must be smaller than the board to avoid wrapping around the board and reserving a time period that is improperly close to the fence. It may be the case that the priority level is full and reservations only open up as the fence is advanced. In this situation, any PUT will be reserved just behind the advancing fence.

Once the reservation is made, the applicable channel descriptor identifier is placed in the corresponding entry in context RAM 735. The scheduling parameters may also be updated and written back to the context buffer. The in-use count for the context buffer is decremented.

Those skilled in the art will appreciate variations of the above-described embodiments that fall within the,scope of the invention. As a result, the invention is not limited to the specific examples and illustrations discussed above, but only by the following claims and their equivalents.

What is claimed is:

1. An integrated circuit that processes communication packets, the integrated circuit comprising:
    a core processor configured to execute a software application that directs the core processor to process the communication packets; and
    scheduling circuitry comprising multiple scheduling boards wherein at least some of the scheduling boards have multiple priority levels, and wherein the scheduling circuitry is configured to process the scheduling boards to schedule and subsequently initiate transmission of the communication packets; and
    wherein the scheduling circuitry is configured to move a fence across a time period on one of the boards at time intervals and initiate packet transmission for a reservation at the fence that is at a higher one of the priority levels than the other reservations at the fence.

2. The integrated circuit of claim 1 wherein the scheduling circuitry is configured to advance the fence at the higher one of the priority levels by one of the time periods at a next one of the time intervals after initiating packet transmission for the one reservation.

3. The integrated circuit of claim 2 wherein the scheduling circuitry is configured not to advance the fence for the other reservations at the fence at next one of the time intervals after initiating packet transmission for the one reservation.

4. The integrated circuit of claim 1 wherein the scheduling circuitry comprises a context memory and is configured to associate each scheduling board with different portions of the context memory.

5. The integrated circuit of claim 4 wherein each scheduling board is separated into time periods at each of the priority levels, the context memory comprises a plurality of entries that is each configured to store one of a plurality of channel descriptor indicators, and wherein each of the time periods at each of the priority levels on each of the scheduling boards is associated with a different one of the context memory entries.

6. The integrated circuit of claim 5 wherein the scheduling circuitry is configured to set at least a first bit in a first one of the time periods at a first one of the priority levels on one of the scheduling boards to schedule packet transmission over a first channel corresponding to a first one of the channel descriptors stored in a first one of the entries associated with the first time period at the first priority level.

7. The integrated circuit of claim 6 wherein the scheduling circuitry is configured to set at least a second bit in the first time period at a second one of the priority levels on the one scheduling board to schedule packet transmission over a second channel corresponding to a second one of the channel descriptors stored in a second one of the entries associated with the first time period at the second priority level, and to initiate packet transmission for the first time period over the first channel but not the second channel because the first priority level is higher that the second priority level.

8. The integrated circuit of claim 6 wherein the scheduling circuitry is configured to set a second bit in a second one of the time periods at a second one of the priority levels on the one scheduling board to schedule packet transmission over a second channel corresponding to a second one of the channel descriptors stored in a second one of the entries associated with the second time period at the secondary priority level, and to initiate packet transmission for the first time period over the first channel but not the second channel because the first priority level is higher than the second priority level.

9. The integrated circuit of claim 6 wherein the scheduling circuitry is configured to process each of the scheduling boards independently of the other scheduling boards.

10. A method of operating an integrated circuit that processes communication packets, the method comprising:
   in a core processor, executing a software application that directs the core processor to process the communication packets; and
   in scheduling circuitry comprising multiple scheduling boards wherein at least some of the scheduling boards have multiple priority levels, processing the scheduling boards to schedule and subsequently initiate transmission of the communication packets;
   wherein processing the scheduling boards to initiate transmission of the communication packets comprises, moving a fence across the time periods on one of the scheduling boards at time intervals; and
   initiating packet transmission for a reservation at the fence that is at a higher one of the priority levels than the other reservations at the fence.

11. The method of claim 10 wherein processing the scheduling boards to initiate transmission of the communication packets comprises advancing the fence at the higher one of the priority levels by one of the time periods at a next one of the time intervals after initiating packet transmission for the one reservation.

12. The method of claim 11 wherein processing the scheduling boards to initiate transmission of the communication packets comprises not advancing the fence for the other reservations at the fence at next one of the time intervals after initiating packet transmission for the one reservation.

13. The method of claim 10 wherein the scheduling circuitry comprises a context memory and wherein processing the scheduling boards to schedule transmission of the communication packets comprises associating each scheduling board with a different portion of the context memory.

14. The method of claim 13 wherein each scheduling board is separated into time periods at each of the priority levels, the context memory comprises a plurality of entries, and each of the time periods at each of the priority levels on each of the scheduling boards is associated with different ones of the context memory entries, and wherein processing the scheduling boards to schedule transmission of the communication packets comprises storing a plurality of individual channel descriptor indicators in the different ones of the context memory entries.

15. The method of claim 14 wherein processing the scheduling boards to schedule transmission of the communication packets comprises setting a first bit in a first one of the time periods at a first one of the priority levels on one of the scheduling boards to schedule packet transmission over a first channel corresponding to a first one of the channel descriptors stored in a first one of the entries associated with the first time period at the first priority level.

16. The method of claim 15 wherein processing the scheduling boards to schedule transmission of the communication packets comprises:
   setting a second bit in the first time period at a second one of the priority levels on the one scheduling board to schedule packet transmission over a second channel corresponding to a second one of the channel descriptors stored in a second one of the entries associated with the first time period at the second priority level; and
   initiating packet transmission for the first time period over the first channel but not the second channel because the first priority level is higher that the second priority level.

17. The method of claim 15 wherein processing the scheduling boards to schedule transmission of the communication packets comprises:
   setting a second bit in a second one of the time periods at a second one of the priority levels on the one scheduling board to schedule packet transmission over a second channel corresponding to a second one of the channel descriptors stored in a second one of the entries associated with the second time period at the second priority level; and
   initiating packet transmission for the first time period over the first channel but not the second channel because the first priority level is higher than the second priority level.

18. The method of claim 15 wherein processing the scheduling boards to schedule and subsequently initiate transmission of the communication packets comprises processing each of the scheduling boards independently of the other scheduling boards.

* * * * *

UNITED STATES PATENT AND TRADEMARK OFFICE
CERTIFICATE OF CORRECTION

PATENT NO. : 6,760,337 B1
DATED : July 6, 2004
INVENTOR(S) : Wilson P. Snyder, II, Joseph B. Tompkins, and Daniel J. Lussier It is certified that error appears in the above-identified patent and that said Letters Patent is hereby corrected as shown below:

<u>Title page,</u>
Item [73], Assignee, should read -- Mindspeed Technologies, Inc., Newport Beach, CA (US) --.

Signed and Sealed this

Fourteenth Day of September, 2004

JON W. DUDAS
*Director of the United States Patent and Trademark Office*